July 26, 1932.  R. THUM  1,868,858

PROCESS FOR THE HOMOGENIZATION OF GLASS FLUX

Filed Dec. 6, 1929

INVENTOR
Rudolf Thum
by
Attorney

Patented July 26, 1932

1,868,858

UNITED STATES PATENT OFFICE

RUDOLF THUM, OF UNTERREICHENAU, CZECHOSLOVAKIA, ASSIGNOR TO THE FIRM MONTAN- UND INDUSTRIALWERKE, VORMALS JOH. DAV. STARCK, OF PRAGUE, CZECHOSLOVAKIA

PROCESS FOR THE HOMOGENIZATION OF GLASS FLUX

Application filed December 6, 1929, Serial No. 412,082, and in Czechoslovakia December 7, 1928.

In modern drawing processes for the manufacture of plate glass, it is found, in an unpleasant or inconvenient manner, that the glass, before it arrives at that region where the actual drawing process takes place undergoes a thermic and chemical dehomogenization, whereby the quality of the glass plate is prejudicially affected.

Figure 1:
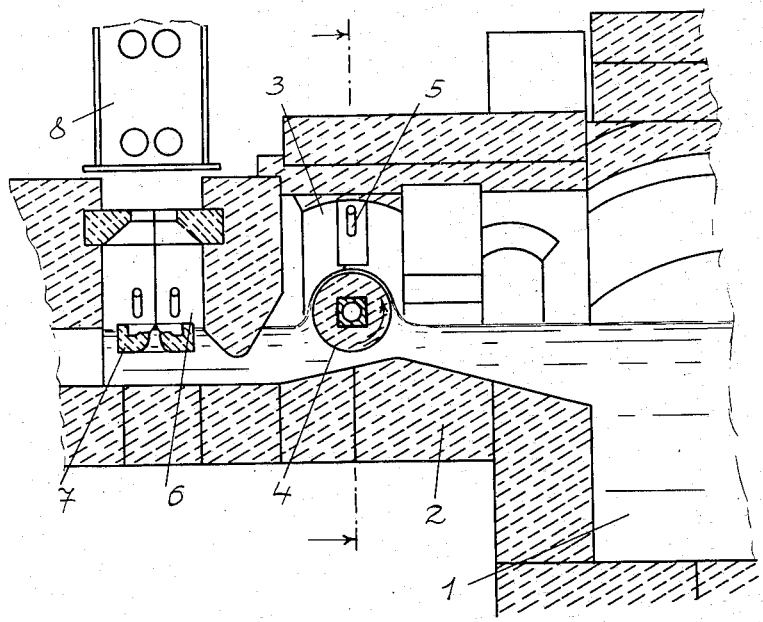

The present invention, however, has for its object to render the mass of glass homogeneous, due to the fact that in a chamber, which is located before the actual drawing chamber, there is located as close as possible to the bottom, but projecting above the surface of the mass of glass, a revolving member or contrivance, due to the rotation of which in a counter clockwise direction in the example illustrated by Figure 1 of the accompanying drawing the passage or flow of the glass is checked at the bottom and the glass flowing out of the smelting trough is conveyed in the direction of rotation and is caused to pass by a cooling pocket.

Due to the arrangement according to the present invention it is rendered possible to keep the mass of glass close up to the drawing device at a high temperature and thus efficiently retard the thermic dehomogenization, partly caused by the successive cooling-off.

The glass in a still hot condition is quickly cooled off in a thin layer, so that any dehomogenization is rendered impossible.

By the rotation of the revoluble body or contrivance, the fresh glass carried along thereby and entering the anti-chamber is well mixed with the glass contained therein and homogenized.

Due to the rapid cooling-off and to the short passage to be traversed before reaching the drawing apparatus, it is possible to convey the glass thereto at a lower temperature and thus secure a greater rapidity of the drawing process.

Figure 2:
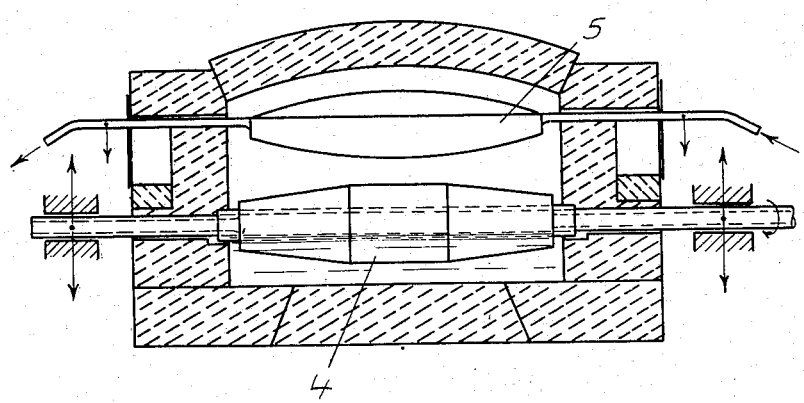

An arrangement in accordance with the invention is shown, by way of example, in the accompanying drawing in diagrammatical form, Figure 1 being a longitudinal section, and Figure 2 showing a cross-section taken through the line A—B, of Figure 1.

The mass of glass passes out of the smelting furnace 1 over a bridge 2 into a special anti-chamber 3, in which there is erected in the path to be traversed by the glass a roller-shaped member 4 of such a cross-section that it extends near to the bottom, but at the same time projects considerably above the surface of the glass. In this way, on the one hand, the flowing-through of the glass between the rotating member and the bottom is checked and, on the other hand, the glass is carried along by the rotating member in the direction in which it rotates and is caused to pass by a cooling pipe 5 suspended above the rotating body. Through the hollow shaft of the body 4, and also through the pipe 5, a suitable cooling medium can be conducted. A mass of glass rapidly cooled, mixed together and consequently rendered quite homogeneous in such a manner is thereupon passed on to the drawing chamber 6. In the example illustrated, the sheet of glass is drawn up vertically by the drawing head 7 into the cooling furnace 8.

The arrangement can also be used in conjunction with the horizontal drawing process.

The rotating member according to the invention is made preferably of chamotte (fireclay) or heat-resisting metal.

What I claim and desire to secure by Letters Patent of the United States is:—

1. A process for rendering glass homogeneous, in which a rotating body is dipped into a trough and extends nearly to the bottom thereof while a part of its length projects above the surface of the glass, and which is so set in rotation that the glass on its way from the smelting trough to the working trough is carried in the form of a thin layer across the portion of the rotating body which projects from the surface of the glass.

2. A process for rendering glass homogeneous, in which a rotating body is dipped into a trough and extends nearly to the bottom thereof while a part of its length projects above the surface of the glass, and which is so set in rotation that the glass on its way from the smelting trough to the working trough is carried in the form of a thin layer across the portion of the rotating body which projects from the surface of the glass, and then cooling said thin layer of glass.

In testimony whereof I affix my signautre.

THUM, RUDOLF.